United States Patent
Noble et al.

(10) Patent No.: US 8,648,551 B2
(45) Date of Patent: Feb. 11, 2014

(54) DEVICE FOR CONTINUOUSLY REORIENTING A SOLAR PANEL

(75) Inventors: Robert L. Noble, Encinitas, CA (US); Desmond Wheatley, Los Angeles, CA (US)

(73) Assignee: Envision Solar International, Inc., San Diego, CA (US)

( * ) Notice: Subject to any disclaimer, the term of this patent is extended or adjusted under 35 U.S.C. 154(b) by 381 days.

(21) Appl. No.: 13/099,152

(22) Filed: May 2, 2011

(65) Prior Publication Data

US 2012/0279550 A1     Nov. 8, 2012

(51) Int. Cl.
*H02K 7/14* (2006.01)
(52) U.S. Cl.
USPC .............. 318/8; 318/560; 126/569; 126/573; 126/576; 136/243; 250/203.4
(58) Field of Classification Search
USPC .......................... 250/203.4; 126/569; 136/243
See application file for complete search history.

(56) References Cited

U.S. PATENT DOCUMENTS

| 4,209,236 A * | 6/1980 | Horton et al. ..................... 353/3 |
| 7,705,277 B2 | 4/2010 | Noble et al. |
| 2007/0246095 A1 * | 10/2007 | Schaefer ........................ 136/246 |
| 2009/0050194 A1 | 2/2009 | Noble et al. |
| 2009/0229200 A1 | 9/2009 | Noble et al. |

* cited by examiner

*Primary Examiner* — Eduardo Colon Santana
*Assistant Examiner* — Bickey Dhakal
(74) *Attorney, Agent, or Firm* — Nydegger & Associates

(57) ABSTRACT

A system and method are provided for continuously reorienting a solar panel array while maintaining a substantially stationary footprint for the solar panel. A cylindrically shaped knuckle is provided that is formed with a bottom surface and a top surface that is slanted relative to the bottom surface at a slant angle φ. One end of an upper pole is positioned against the top surface of the knuckle, and one end of a lower pole is positioned against the bottom surface of the knuckle. An upper and lower motor respectively connect the knuckle to the upper pole and the lower pole. These motors are used to continuously rotate the knuckle at an angular velocity ω relative to the upper and lower poles. When the knuckle rotates, the upper and lower poles remain stationary to allow the solar panel to continuously reorient while maintaining a substantially stationary footprint.

17 Claims, 2 Drawing Sheets

DEVICE FOR CONTINUOUSLY REORIENTING A SOLAR PANEL

FIELD OF THE INVENTION

The present invention pertains generally to a device and method for converting solar energy into electricity. More particularly, the present invention pertains to a device and method for continuously reorienting a solar panel to increase the efficiency of the solar panel. The present invention is particularly, but not exclusively, useful as a solar panel that can be continuously reoriented while maintaining a substantially stationary footprint.

BACKGROUND OF THE INVENTION

The angle at which solar radiation strikes an energy converting unit (e.g. a group of photovoltaic cells on a solar panel) can significantly affect the unit's ability to convert solar energy into electrical energy. Optimally, this angle of incidence for solar radiation will be ninety degrees (i.e. an energy converting unit operates most efficiently when oriented so that solar radiation is directed at a right angle, perpendicular to the surface of the energy converting unit). To do this, the energy converting unit is required to move to track the sun. This, however, may be difficult or impractical to achieve. One reason for this difficulty is the continuous movement of the sun throughout the day. And, a second reason for this difficulty is that a solar panel must be continuously reoriented while not interfering with other activities taking place in the vicinity of the solar panel.

Although the efficiencies of energy converting units are diminished as the angle of incidence deviates from perpendicular, the diminution of efficiency is minimal with small deviations. On the other hand, with relatively large deviations from perpendicular, the diminished effect quickly becomes significant. To minimize this loss and, conversely, to maximize system efficiency, the structure on which the energy converting unit is mounted (e.g. a solar panel) must effectively track the movement of the sun. Operationally, this must be done in compliance with two considerations. These are: azimuth and elevation.

In order to effectively track the movement of the sun, it is clear that both the azimuthal movements and elevation considerations for a solar panel are important. For example, the panel must first be pointed in the proper azimuthal direction (i.e. toward the sun). Secondly, once the azimuth is established, the panel must then be inclined in elevation to optimize (maximize) the angle of incidence. On the first point (i.e. azimuthal tracking), in comparison with a stationary solar panel, it has been determined that the overall efficiency of energy converting units can be improved by around twenty percent when the solar panel azimuthally tracks the sun. On the second point, for latitudes of the United States, in comparison with a horizontally oriented solar panel, an inclination angle for elevation of about ten to twenty degrees has been determined to be generally optimal.

To effectively track the movement of the sun described above, it is necessary to constantly reposition a solar panel. Such constant repositioning presents difficulties when considering the placement of a solar panel. As a solar panel is often part of an array of multiple solar panels, consideration must be given to the location of other solar panels as the motion may cause two panels to impact one another. The impact of two solar panels may cause damage to the panel or disrupt the ability of a panel to maintain an optimal angle of incidence with the sun. A further consideration for the movement of a solar panel is the footprint of the solar panel, meaning the area of the ground beneath the solar panel. As solar panels become more prevalent in public areas, designers must ensure the footprint of the solar panel remains substantially stationary. If the footprint of the solar panel is allowed to move, the solar panel may interfere with activities being conducted in its vicinity. For example, rotating a solar panel used to power lighting in a parking lot may obstruct the movement of fire trucks and other safety vehicles in the parking lot.

In light of the above it is an object of the present invention to provide a system for continuously reorienting a solar panel to track the sun, and to thereby maximize solar energy utilization. Another object of the present invention is to provide a system for continuously reorienting a solar panel while maintaining a substantially stationary footprint. Yet another object of the present invention is to provide a system for continuously reorienting a solar panel that is easy to use, is relatively simple to manufacture, and is comparatively cost effective.

SUMMARY OF THE INVENTION

In accordance with the present invention, a system and method for continuously reorienting a solar array is provided. More particularly, each solar panel in the solar array is constructed with two motors to rotate a cylindrically-shaped knuckle, and consequently, continuously reorient each solar panel. As the knuckle is rotated, the solar panel reorients in two directions: (1) through an incline angle "$\alpha$," and (2) through a tilt angle "$\beta$." By reorienting in this manner, the individual solar panels will not make contact with one another.

In a preferred embodiment, the system and method of the present invention are applicable to a solar array with a plurality of solar panels. Although the preferred embodiment of the present invention is for use with a solar array, an embodiment using a single solar panel may also be used. Each of the solar panels in an array is constructed with the elements described here.

Structurally, an essential component of the present invention is a knuckle. In detail, the knuckle is cylindrical in shape and has a top surface and a bottom surface. A critical aspect of the knuckle is its slanted shape, where the top surface is slanted relative to the bottom surface by a slant angle $\phi$. The value for the slant angle is contemplated to be between approximately 5° and approximately 30°. As far as location, the knuckle is positioned between an upper pole and a lower pole, each having a first end and a second end. In particular, the top surface of the knuckle is in contact with the first end of the upper pole, and the bottom surface of the knuckle is in contact with the first end of the lower pole.

The solar panel is rigidly affixed to the second end of the upper pole. Importantly, by rigidly affixing the solar panel in this manner, the solar panel cannot move in an unrestricted manner. Furthermore, the second end of the lower pole is embedded directly into the ground or into some type of support structure which is embedded into the ground. For instance, a cement pile embedded into the ground can be provided to receive the second end of the lower pole. Additional structural components include two motors, with an upper motor joining the upper pole and the knuckle, and a lower motor joining the lower pole and the knuckle. Both the upper motor and the lower motor are one-way, constant speed motors. These motors cooperatively rotate the knuckle to change the orientation of the solar panel as described in more detail below.

In operation, the cooperation of the upper motor and the lower motor will rotate the knuckle at an angular velocity "ω" relative to both the upper pole and the lower pole. The angular velocity "ω" of the knuckle is defined as the change in a rotational angle θ over time (dθ/dt), where θ is measured relative to the upper and lower poles. Importantly, for the present invention, the value of θ must remain constant for both the upper and the lower pole to ensure only the knuckle rotates (i.e. for the upper and lower poles ω=0). As the knuckle rotates, the solar panel will continuously reorient without rotating because of the slant angle φ of the knuckle. More specifically, as the knuckle rotates, the characterization of the contact between the first end of the upper pole and the knuckle will change and cause a continuous reorienting of the solar panel. In detail, the solar panel will reorient in two different directions as the knuckle rotates. As defined for the present invention, the panel will rotate through an incline angle "α" relative to a first axis and will rotate through a tilt angle "β" relative to a second axis. Both axes are on a plane defined by the solar panel, and the first axis and the second axis are orthogonal. As envisioned for the present invention, the incline angle "α" and the tilt angle "β" will respectively vary sinusoidally. Both the tilt angle and the incline angle will have an amplitude in a range of ±φ.

Another important aspect of the present invention is the footprint of the solar panel which is defined as the area on the surface directly beneath the solar panel when the solar panel is oriented parallel to this surface. When in this configuration, the footprint will have substantially the same dimensions as the solar panel. As expected, each solar panel in the solar array will have its own unique footprint. For the present invention, the solar panels will be positioned such that the footprints of respective panels do not intersect. In doing so, the solar panels will have a substantially stationary footprint and will not contact one another while reorienting.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
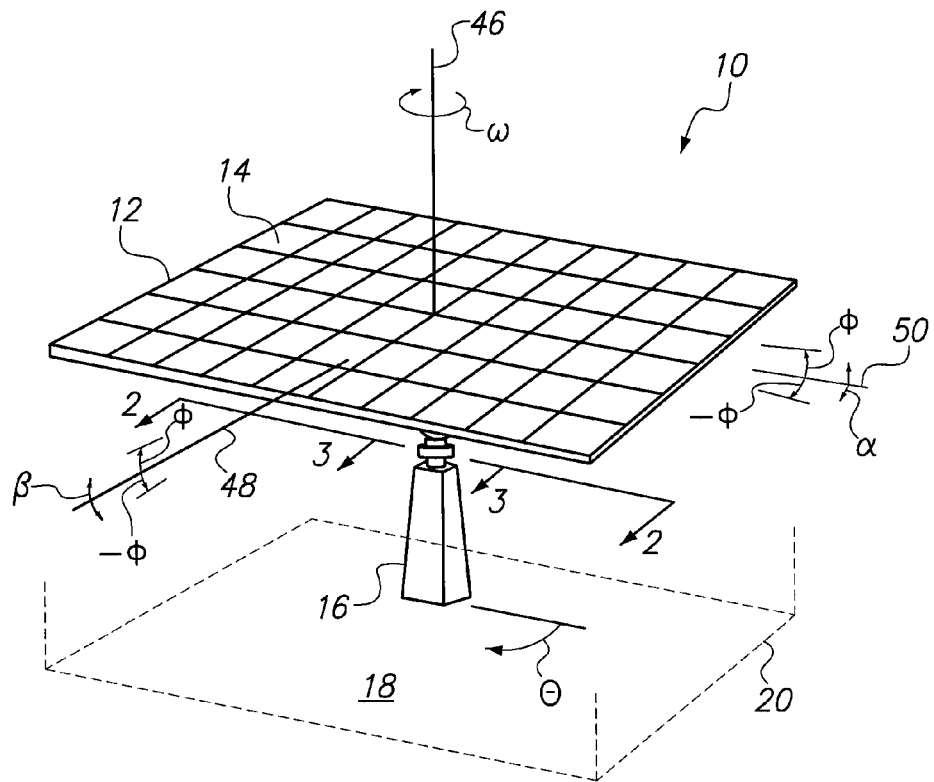
FIG. 1 is a perspective view of the device of the present invention in an operational environment.

Referring initially to FIG. 1, a perspective view of the device of the present invention is shown and generally designated 10. As shown, a prominent feature of the device 10 is a solar panel 12 made with a plurality of solar cells 14. In addition, a pile 16 anchors the device 10 to a surface 18. In a preferred embodiment, the pile 16 is made of concrete. In other embodiments, the pile 16 may be made of any other material suitable for anchoring the device 10 to the surface 18. Or, the device 10 may be embedded directly into the surface 18. An additional important aspect of the device 10 is a footprint 20. In detail, as shown in FIG. 1, the footprint 20 is the area on the surface 18 directly below the solar panel 12. As contemplated for the present invention, the solar panel 12 will have no substantial movement outside of the footprint 20.

Figure 2:
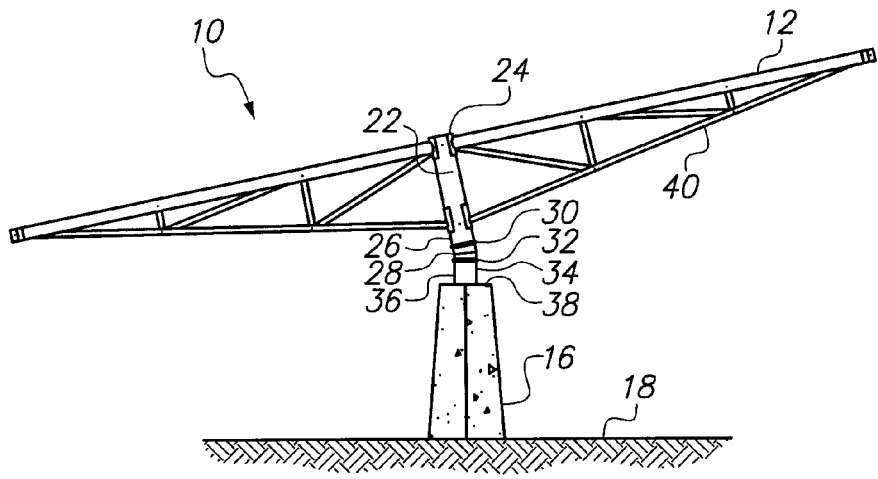
FIG. 2 is a cross section view of the device of the present invention as seen along line 2-2 in FIG. 1.

Now, referring to FIG. 2, a cross-section of the device 10 is shown along line 2-2 in FIG. 1. In FIG. 2, the solar panel 12 is shown connected to an end 24 an upper pole 22, while the opposite end 26 of the upper pole 22 is connected to a knuckle 28. Importantly, the solar panel 12 is rigidly affixed to the end 24 of the upper pole 22. By using a rigid connection in this manner, the solar panel 12 cannot rotate freely around the upper pole 22. As can be seen in FIG. 2, the knuckle 28 has a top surface 30 and a bottom surface 32. Further, the knuckle 28 is positioned between the upper pole 22 and a lower pole 34, with the lower pole 34 having an end 36 and an end 38. In further detail, the end 36 of the lower pole is connected to the knuckle 28, while the second end 38 is connected to the pile 16. In another embodiment of the present invention, the second end 38 of the lower pole 34 may be embedded directly into the ground. A further structural element which may be required, depending on the size of the solar panel 12, is a support truss 40 attached to the upper pole 22 to support the weight of the solar panel 12.

Figure 3:
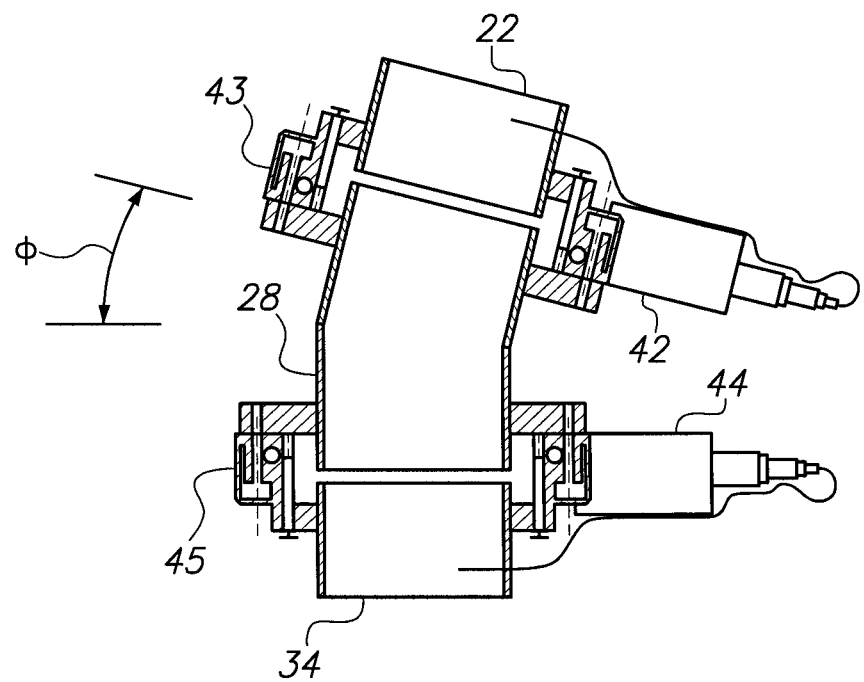
FIG. 3 is a cross-section view of the drive mechanism of the device of the present invention as seen along the line 3-3 in FIG. 1.

Referring now to FIG. 3, a detail of the device 10 of the present invention is shown along line 3-3 in FIG. 1. Here, the knuckle 28 is shown positioned between the upper pole 22 and the lower pole 34. In this view, the slant angle φ of the knuckle 28 can be seen more clearly. In addition, the end 26 of the upper pole 22 is connected to the knuckle 28 by an upper motor 42 having a gear assembly 43. And the lower pole 34 is connected to the knuckle by a lower motor 44 having a gear assembly 45. Both the upper motor 42 and the lower motor 44 are one-way, constant speed motors designed to rotate the knuckle 28 at an angular velocity of ω, with ω=1 revolution/day and being defined as (dθ/dt). At the same time, the upper pole 22 and the lower pole 34 remain fixed while the knuckle 28 rotates.

By cross-referencing FIG. 1 and FIG. 3, an operation of the device 10 can be seen. As shown in FIG. 1, an axis of rotation 46 is aligned with the pile 16. Once the upper motor 42 and the lower motor 44 are activated, the knuckle 28 rotates at an angular velocity of ω around the axis of rotation 46. At the same time, the upper pole 22 and the lower pole 34 remain stationary with θ remaining constant for both the upper pole 22 and the lower pole 34. In FIG. 1, it can be seen that θ measures the angle of rotation around the axis of rotation 46. With the knuckle 28 rotating in this manner and the upper pole 22 and the lower pole 34 remaining stationary, the solar panel 12 will continuously reorient through both an incline angle "α" and a tilt angle "β" as shown in FIG. 1. Thus, the solar panel 12 defines a plane with a first axis 48 and second axis 50, which are orthogonal to one another. As far as range of motion for the solar panel 12 is concerned, both the incline angle "a" and the tilt angle "β" can move in a range of ±φ degrees as shown in FIG. 1. By staying within these parameters, the solar panel 12 is reoriented without any type of substantial movement occurring outside of the footprint 20.

Figure 4:
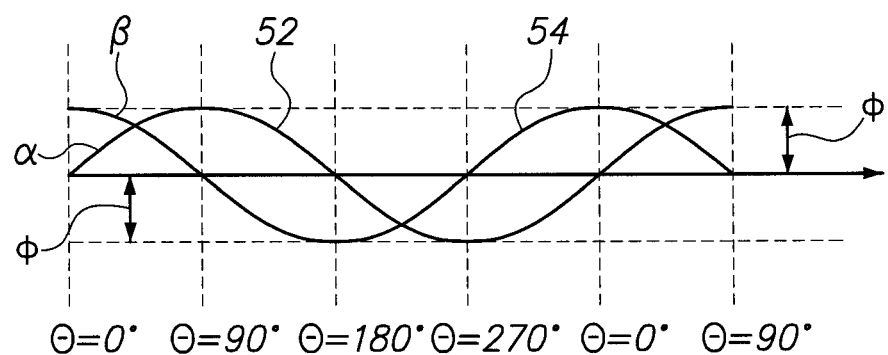
FIG. 4 is a graphical representation of the relationship between the variables incline angle "α," tilt angle "β," slant angle "φ," and rotation angle "θ" as used for the present invention.

Finally, referring to FIG. 4, a graphical representation for measurements pertinent to the present invention is shown. Specifically, the four measurements shown are: (1) incline angle "α," (2) tilt angle "β," (3) slant angle "φ" and (4) rotational angle "0." As shown in FIG. 4, the incline angle and the tilt angle vary sinusoidally from one another, as shown, with the "α" sine wave 52 and the "zβ" sine wave 54. Furthermore, the values for incline angle and tilt angle will be between φ and (−φ) as depicted. By showing θ every 90 degrees, an appreciation is given for the relationship between the incline angle and the tilt angle as the knuckle 28 makes a complete rotation around the axis of rotation 46. In FIG. 4, it can be seen that the value for θ will repeat after reaching 360°. The reason for this is that the knuckle 28 is in continuous motion whenever the upper motor 42 and the lower motor 44 are activated. Thus, the motion of the solar panel 12, as defined by the tilt and incline angles, will keep repeating until the device 10 is shut down. These movements are dependent on the angular velocity "ω," which is one revolution per day (i.e. ω=1 revolution/day). Importantly, the device 10 may not complete one revolution per day because of variations in the amount of sunlight based on seasonal differences. As is well-known, the amount of sunlight during the summer months is greater than the amount of sunlight during the winter months. Thus, the device 10 will receive increased exposure to sunlight during the summer months. Furthermore, when the sun goes down, the device 10 may be turned off and rotated back to a starting position to begin rotating when the sun rises the following day.

While the particular Device for Continuously Reorienting a Solar Panel as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for continuously reorienting a solar panel array while maintaining a substantially stationary footprint which comprises:
   an upper pole defining an axis and having a first end and a second end, wherein a solar panel is affixed to the second end thereof;
   a lower pole defining an axis and having a first end and a second end, wherein the second end thereof is embedded into the ground with the lower pole oriented substantially vertical;
   a cylindrical shaped knuckle having a top surface and a bottom surface, wherein the top surface is slanted relative to the bottom surface by a slant angle φ, wherein the first end of the upper pole is positioned against the top surface of the knuckle and the first end of the lower pole is positioned against the bottom surface of the knuckle and wherein the solar panel defines a first axis for rotation of the panel through an incline angle α and a second axis for rotation of the panel through a tilt angle β, wherein the first and second axes are orthogonal;
   an upper motor mounted on the knuckle and having a gear assembly engaged with the knuckle, and an upper gear assembly engaged with the upper pole for rotating the knuckle at an angular velocity ω (ω=dθ/dt) relative to the upper pole, wherein θ for the upper pole is held constant to continuously reorient the solar panel without rotating the solar panel around the axis of the lower pole to maintain a substantially stationary footprint; and
   a lower motor mounted on the knuckle and having a gear assembly engaged with the lower pole, and an upper gear assembly engaged with the knuckle for rotating the knuckle at an angular velocity ω (ω=dθ/dt) relative to the lower pole, wherein θ for the lower pole is held constant and wherein the angles α and β respectively vary sinusoidally at a frequency ω with an amplitude in a range of ±φ.

2. A device as recited in claim 1 wherein the first axis and the second axis are both on a plane defined by the solar panel.

3. A device as recited in claim 1 wherein the slant angle φ is in a range between approximately 5° and approximately 30°.

4. A device as recited in claim 1 wherein ω is one revolution per day (ω=1/day).

5. A device as recited in claim 1 wherein the upper motor and the lower motor are each a one-way, constant speed motor.

6. A device as recited in claim 1 wherein the solar panel is rigidly affixed to the second end of the upper pole.

7. A method for continuously reorienting a solar panel array while maintaining a substantially stationary footprint which comprises the steps of:
   providing a cylindrically shaped knuckle having a top surface and a bottom surface, wherein the top surface is slanted relative to the bottom surface by the slant angle φ;
   attaching an upper pole defining an axis to the knuckle, wherein the upper pole has a first end and a second end, and wherein the first end of the upper pole is positioned against the top surface of the knuckle, and wherein a solar panel is affixed to the second end thereof;
   attaching a lower pole defining an axis and having a first end and a second end, wherein the first end of the lower pole is positioned against the bottom surface of the knuckle, and wherein the second end thereof is embedded into the ground with a substantially vertical orientation and wherein the solar panel defines a first axis for rotation of the panel through an incline angle α and a second axis for rotation of the panel through a tilt angle β, wherein the first and second axes are orthogonal;
   rotating the knuckle with an upper motor at an angular velocity ω (ω=dθ/dt) relative to the upper pole;
   rotating the knuckle with a lower motor at the angular velocity ω (ω=dθ/dt) relative to the lower pole; and
   maintaining θ at a constant value for the upper pole and the lower pole to continuously reorient the solar panel while maintaining a substantially stationary footprint and wherein the angles α and β respectively vary sinusoidally at a frequency ω with an amplitude in a range of ±φ.

8. A method as recited in claim 7 wherein the solar panel defines a plane and the first and second axes of the solar panel lie in the plane.

9. A method as recited in claim 7 wherein the slant angle φ is in a range between approximately 5° and 30°.

10. A method as recited in claim wherein the angular velocity ω is one revolution per day (ω=1/day).

11. A method as recited in claim 7 wherein the upper motor is a one-way, constant speed motor.

12. A method as recited in claim wherein the solar panel is rigidly affixed to the second end of the upper pole.

13. A method as recited in claim 7 wherein reorienting the solar panel maintains constant contact between the solar panel and the rays of the sun.

14. A system for continuously reorienting a plurality of solar panels which comprises:
   a plurality of solar panels;
   a first pole defining an axis and having a first end and a second end, wherein a solar panel is affixed to the second end thereof;
   a second pole defining an axis and having a first end and a second end, wherein the second pole is embedded into the ground in a substantially vertical orientation;
   a cylindrical shaped knuckle having a top surface and a bottom surface, wherein the top surface is slanted relative to the bottom surface by a slant angle φ, wherein the first end of the first pole is positioned against the top surface of the knuckle and the first end of the second pole is positioned against the bottom surface of the knuckle and wherein the solar panel defines a first axis for rotation of the panel through an incline angle $\alpha$ and a second axis for rotation of the panel through a tilt angle $\beta$, wherein the first and second axes are orthogonal;

a first motor mounted on the first pole, wherein the first motor has a gear assembly engaged with the knuckle to continuously rotate the knuckle at an angular velocity $\omega$ ($\omega=d\theta/dt$) relative to the first pole; and a second motor mounted on the second pole, wherein the second motor has a gear assembly engaged with the knuckle to continuously rotate the knuckle at an angular velocity $\omega$ ($\omega=d\theta/dt$) relative to the second pole, wherein $\theta$ is held constant for the first pole, along with a constant $\theta$ for the second pole, to continuously reorient the solar panel without rotating the solar panel around the axis of the lower pole to maintain a substantially stationary footprint and wherein the angles $\alpha$ and $\beta$ respectively vary sinusoidally at a frequency $\omega$ with an amplitude in a range of $\pm\phi$.

15. A system as recited in claim 14 wherein the slant angle $\phi$ is in a range of approximately 5° and 30°.

16. A system as recited in claim 14 wherein the angular velocity $\omega$ is one revolution per day ($\omega=1/day$).

17. A system as recited in claim 14 wherein the first motor is a one-way, constant speed motor.

* * * * *

UNITED STATES PATENT AND TRADEMARK OFFICE
CERTIFICATE OF CORRECTION

| | |
|---|---|
| PATENT NO. | : 8,648,551 B2 |
| APPLICATION NO. | : 13/099152 |
| DATED | : February 11, 2014 |
| INVENTOR(S) | : Robert L. Nobel and Desmond Wheatley |

It is certified that error appears in the above-identified patent and that said Letters Patent is hereby corrected as shown below:

In the Claims:

Column 6, lines 46 and 50 for the claim reference numeral, each occurrence should read -7-.

Page 1 of 1

Signed and Sealed this
Twenty-seventh Day of May, 2014

Michelle K. Lee
*Deputy Director of the United States Patent and Trademark Office*